United States Patent

Hazlewood et al.

[15] 3,664,075
[45] May 23, 1972

[54] PROTECTIVE BUMPER

[72] Inventors: John F. Hazlewood, Milwaukee; Herbert T. Ruehl, Mequon, both of Wis.

[73] Assignee: Kelley Company, Inc., Milwaukee, Wis.

[22] Filed: Nov. 17, 1969

[21] Appl. No.: 877,163

[52] U.S. Cl..............................................52/173, 267/140
[51] Int. Cl..........................................................F16f 1/44
[58] Field of Search.............52/179, 204, 393, 403, 173; 135/5; 61/48; 267/139, 140, 141; 213/220, 221, 222; 114/219; 16/82, 86; 104/29

[56] References Cited

UNITED STATES PATENTS

| | | | |
|---|---|---|---|
| 2,879,985 | 3/1959 | Waddell | 104/29 |
| 3,539,173 | 10/1970 | Sampson | 267/140 |
| 459,251 | 9/1891 | Hall | 16/86 |
| 985,883 | 3/1911 | Burrowes | 16/86 |
| 3,014,710 | 12/1961 | Layne | 61/48 |
| 3,096,973 | 7/1963 | Bergen | 267/140 |
| 3,335,689 | 8/1967 | Hein | 114/219 |
| 3,419,241 | 12/1968 | Way et al. | 248/361 |

FOREIGN PATENTS OR APPLICATIONS

| 1,370,858 | 7/1964 | France | 114/219 |
|---|---|---|---|

*Primary Examiner*—Price C. Faw, Jr.
*Attorney*—Andrus, Sceales, Starke & Sawall

[57] ABSTRACT

A protective bumper for use with a loading dock. The bumper is mounted on the front face of the loading dock on the side of a dockboard which is located within a pit formed in the dock. The bumper has an L-shape, including a horizontal section that extends along the upper edge of the dock and a vertical section that extends downwardly along the side of the pit. To attach the bumper to the dock, one or more bolts are welded to a curb angle on the dock and the bolts extend within holes formed in the bumper. In the preferred form, the bolts have a generally L-shape with one leg of each bolt being welded flatwise to the curb angle and located within a slot formed in the back surface of the bumper, while the other leg extends outwardly within a hole in the bumper and receives a nut.

16 Claims, 7 Drawing Figures

Patented May 23, 1972
3,664,075
2 Sheets-Sheet 1
FIG.1
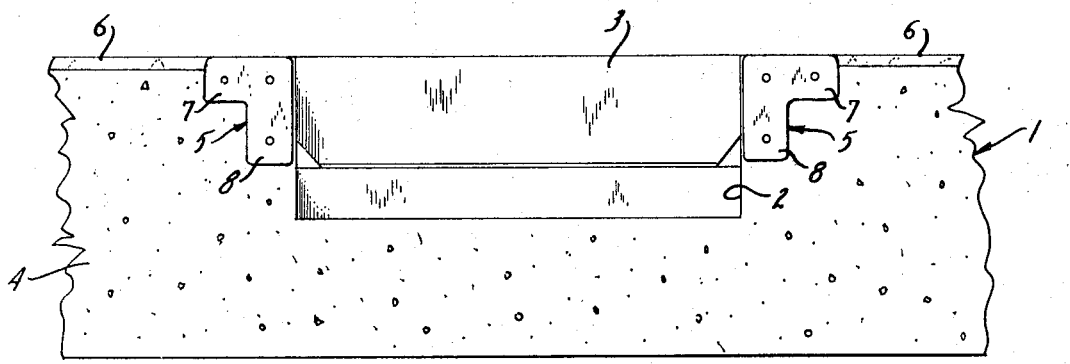
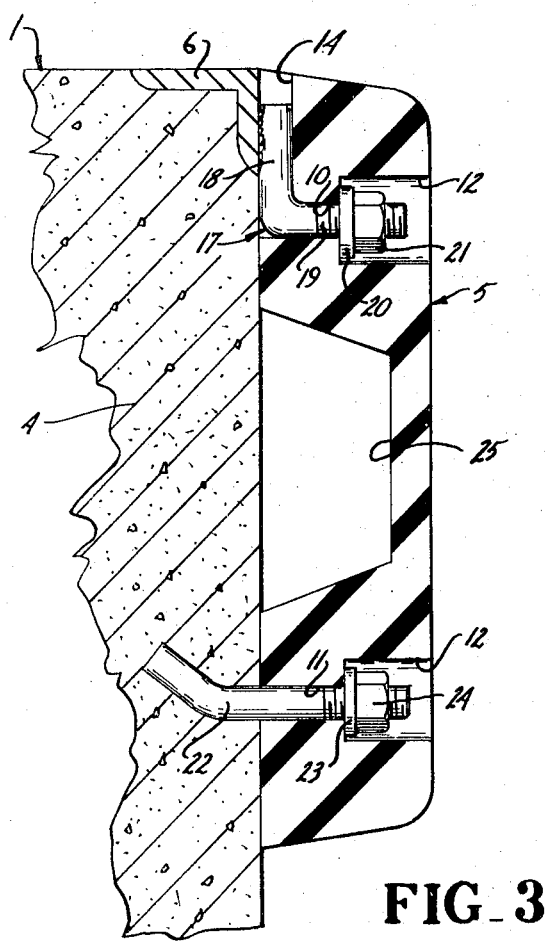
FIG.3
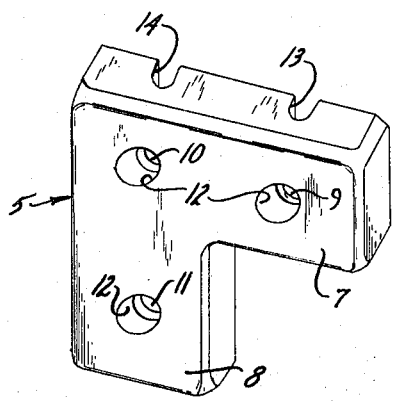
FIG.2
INVENTORS
JOHN F. HAZLEWOOD
HERBERT T. RUEHL
BY
Attorneys Patented May 23, 1972
3,664,075
2 Sheets-Sheet 2
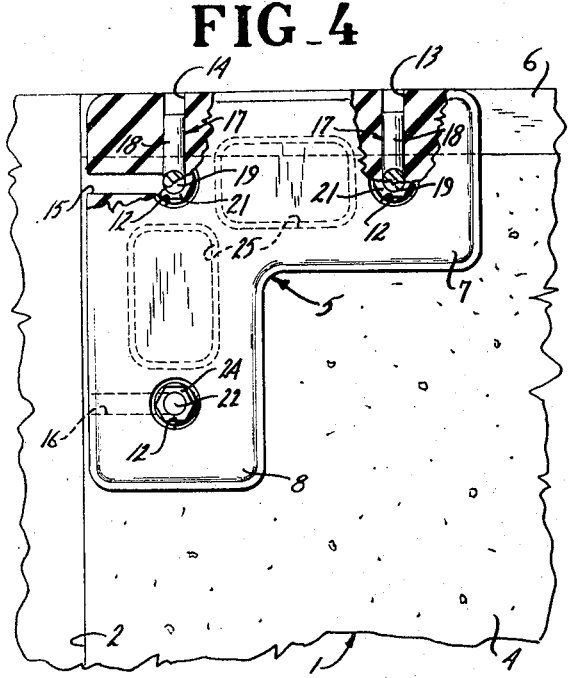
FIG_4
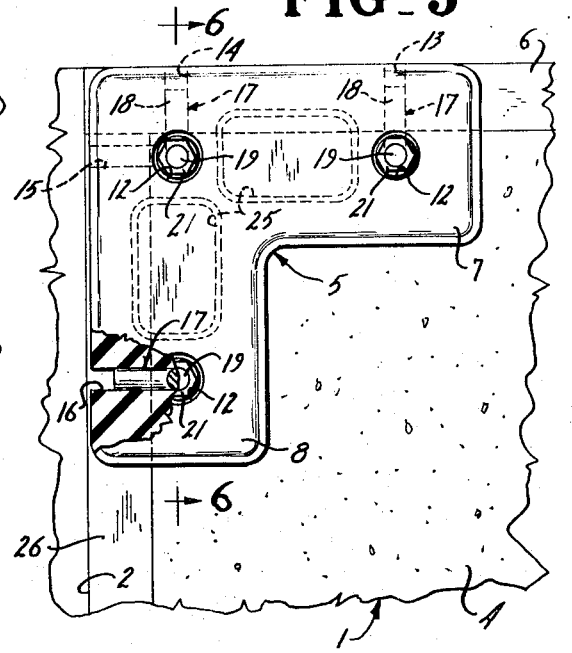
FIG_5
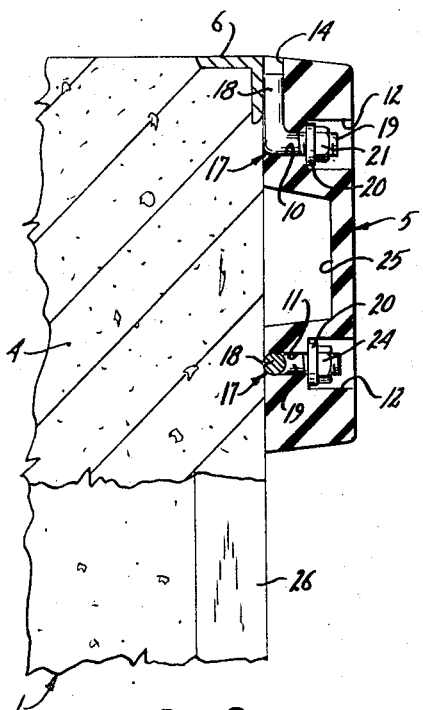
FIG_6
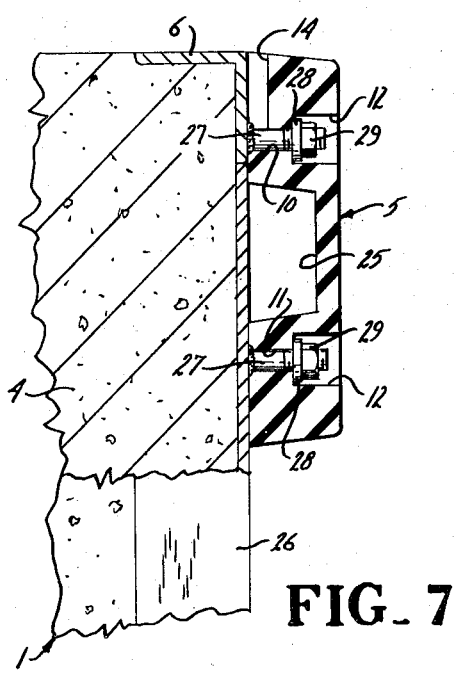
FIG_7
INVENTORS
JOHN F. HAZLEWOOD
HERBERT T. RUEHL
BY
Attorneys

PROTECTIVE BUMPER

This invention relates to a protective resilient bumper for use with a loading dock and more particularly to a bumper to be installed on the front face of the dock on either side of a dockboard mounted in a pit on the dock.

Protective bumpers are normally installed on the front face of a loading dock to protect the dock and other equipment from damage when a truck or other carrier backs toward the dock. In many instances, one or more dockboards are associated with the dock and the most common type of dockboard is mounted in a pit or depression formed in the dock. With this type of installation, protective bumpers are mounted on either side of the pit, adjacent the dockboard, and serve to protect the dockboard, as well as the dock, from damage as the trucks back towards the dock.

In the past, bumpers have been formed of molded plastic or rubber having a generally rectangular shape, and were mounted on the front face of the dock by a series of anchor bolts embedded within the concrete dock. In some cases the molded bumpers were not sufficiently thick to provide adequate protection so that so that protective steel plates were attached to the front face of the bumper. However, it was found that when a truck backed into the steel plate, the plate would tend to bend or deflect with the result that the bending acted to pull the anchor bolts from the concrete dock. As a further disadvantage, it was necessary to precisely position the anchor bolts when pouring the concrete dock. If the bolts were not precisely set so that they were aligned with the holes in the bumper, it was necessary to cut off the bolts and replace them with concrete expansion bolts.

In the past laminated vehicle tire carcasses have been employed as bumpers. In a laminated bumper of this type the sections of tire carcass are laminated vertically and the bumper is attached by means of angle brackets at its ends to the protective steel curb angle on the dock. The normal curb angle on a loading dock has a vertical depth of approximately 3 inches, and if the mounting brackets on the laminated bumper were welded to a curb angle of this dimension the bumper would not have sufficient vertical depth to protect the dock and dockboard with respect to trucks of varying bed heights. Therefore, in the past it has been recommended that a 10 inch angle be employed as the curb angle of the dock to provide a sufficient vertical depth for welding the angle brackets of the laminated type of bumper.

A second disadvantage of the laminated type of bumper was that the resilient bumper surface could not be positioned immediately adjacent the side edge of the pit due to the use of the angle mounting brackets. To mount the edge of the bumper immediately adjacent the side edge of the pit, it was necessary to substitute a plate in place of the angle bracket and weld the plate edgewise to the curb angle of the dock. This not only required a reconstruction of the bumper, but reduced the strength of the attachment to the dock.

The present invention is directed to an improved protective bumper for use with a loading dock. In accordance with the invention the bumper is mounted on the front face of the dock on either side of a dockboard. Each bumper has an L-shape, including a horizontal section that extends along the upper edge of the dock and a vertical section that extends downwardly along the side edge of the pit. The L-shaped bumper is provided with three mounting holes, one hole being in the horizontal section, a second hole being in the vertical section, and a third hole being at the junction of the horizontal and vertical sections.

To mount the bumper on the dock, a pair of bolts are welded to the horizontal curb angle and extend within the two upper holes in the bumper. A third bolt, which can be either an anchor bolt embedded within the concrete dock, or a bolt welded to a vertical curb angle mounted along the side of the pit, extends through the lower hole in the vertical section of the bumper. Nuts are threadedly engaged with the outer end of each bolt to clamp the bumper against the face of the dock.

The bolts which are welded to the curb angle have an L-shape with one leg of each bolt being welded flatwise against the curb angle and being located within a slot formed in the back surface of the bumper, while the other leg of each L-shaped bolt extends outwardly within the respective hole and receives the nut.

The L-shaped bumper provides both horizontal and vertical protection for the dock and dockboard. The horizontal section of the bumper, which extends along the upper edge of the dock, provides protection for varying widths of carrier bed, while the vertical section of the bumper provides protection for varying heights of carrier beds. The bumper of the invention can be mounted immediately adjacent both the pit and the upper surface of the dock to thereby provide optimum protection for the dock.

As an additional advantage, the bumper can be secured to the dock by welded bolts and this provides a more secure and precise mounting arrangement than that which can be achieved by concrete anchor bolts.

Furthermore, the bumper can be readily removed and replaced, if necessary, by merely unthreading the nuts from the bolts and withdrawing the bumper from the surface of the dock.

As the anchor bolts are welded to the curb angle it is not necessary to set the bolts in the concrete when forming the dock. As the bolts are welded at the time the bumper is installed, the setting of the bolts can be more precisely determined with the result that error in positioning the bolts can be eliminated.

As a further advantage, the bumper, having an L-shaped configuration, is symmetrical and can be used either on the right or left side of the dockboard without alteration or modification.

Other objects and advantages will appear in the course of the following description.

The drawings illustrate the best mode presently contemplated of carrying out the invention.

In the drawings:

FIG. 1 is a front view of a loading dock having a dockboard mounted thereon and having a resilient bumper mounted on each side of the dockboard;

FIG. 2 is a perspective view of the bumper;

FIG. 3 is a vertical section showing the bumper mounted on the front face of the dock;

FIG. 4 is an elevation view of one of the bumpers attached to the dock with parts broken away in section;

FIG. 5 is an elevation view of the bumper using a modified form of attachment to the dock with parts broken away in section;

FIG. 6 is a vertical section taken along line 6—6 of FIG. 5; and

FIG. 7 is a view similar to FIG. 6 showing a further modified form of attachment to the dock.

FIG. 1 shows a loading dock 1 formed with a pit or depression 2 and a dockboard 3 mounted in the pit. The dockboard can be a type similar to that shown in U.S. Pat. Nos. Re. 25,249 or 3,137,017.

Located on the front face 4 of the dock on either side of the dockboard 3 are resilient L-shaped bumpers 5 that serve to protect the dock and dockboard when a truck or other carrier backs toward the dock. The dock 1 is normally provided with a steel curb angle 6 which serves as a protection for the upper edge of the dock.

Each bumper 5 is formed of a resilient rubber-like or plastic material and includes a horizontal section 7 which extends along the upper edge of the dock and a vertical section 8 which extends downwardly along the edge of the pit 2. As best shown in FIG. 2, each bumper 5 is provided with three holes 9, 10 and 11, with the outer portion of each of the holes being enlarged as indicated by 12. In addition, to the holes 9, 10 and 11, the back surface of each bumper is provided with a groove or recess 13 which extends between the hole 9 and the periphery of the bumper. An additional pair of recesses or grooves 14 and 15 are formed in the back surface of the bumper and extend between the hole 10 and the two adjacent side edges of the bumper. Similarly, a recess or groove 16 extends between the hole 11 and the side edge of the bumper.

As illustrated in FIGS. 1–3 the horizontal section 7 of the bumper 5 is connected to the dock by a pair of L-shaped bolts 17, one of which extends through the hole 10 and the other extends through the other upper hole, either hole 9 or 11, depending on whether the bumper is mounted on the right or left side of the dockboard.

For clarity, the following description will relate to the bumper as mounted on the right hand side of the dockboard, in the position shown in FIG. 2 or 3. Each L-bolt 17 is provided with a vertical leg 18 that is welded to the curb angle 6. The vertical leg 18 of the bolt 17 associated with hole 10 extends within the recess 14m and the outer end of the horizontal leg 19 of the bolt 17 is threaded and receives a washer 20 and nut 21. Similarly, the bolt 17 associated with the hole 9 has its vertical leg 18 welded to the curb angle 6 and leg 18 is received within the recess 13. The horizontal leg 19 of this bolt 17 similarly receives a washer 20 and nut 21.

The vertical section 8 of the bumper is attached to the dock 1 by means of an anchor bolt 22 having an inner bent end that is embedded within the concrete dock. The outer end of the anchor bolt extends within the opening 11 and receives a washer 23 and a nut 24. With this construction, the two L-shaped bolts 17 and the anchor bolt 22 along with their cooperating nuts hold the bumper 5 firmly against the wall 4 of the dock.

Due to the fact that the enlarged portion 12 of holes 9-11 has a substantial depth, the ends of the bolts are located a substantial distance from the outer surface of the bumper in a position where they will not be contacted by a truck or other carrier backing into the bumper.

The back surface of the bumper can also be provided with a series of cavities 25 which reduce the weight of the bumper as well as increasing the flexibility thereof.

It is only necessary to set or position the anchor bolt 22 in the concrete when the dock is formed for the bolts 17 are welded to curb angle 6. When it is desired to mount the bumper, the anchor bolt 22 is inserted within the lower hole 11 in the bumper and the positions where the L-bolts 17 are to be welded are marked on the curb angle. The vertical legs 18 of the bolt 17 are then welded to the curb angle, and following the welding, the bumper is installed on the bolts and the nuts 21 are threaded onto the ends of the bolts to complete the installation.

The use of the L-shaped bolts 17 has distinct advantages in that the vertical leg provides a greater surface area for the weld which connects the bolt to the curb angle. In addition, the use of the L-shaped bolts permits the threaded horizontal legs 19 of the bolts to be located a considerable distance beneath the curb angle 6 so that the bolts and the bolt holes are not adjacent the periphery of the bumper, thereby insuring a stronger construction.

As the bolts 17 and 22 are located inwardly of the periphery of the bumper, the bumper can be installed immediately adjacent the pit 2 as well as immediately adjacent the upper surface of the dock.

The horizontal section 7 of the bumper provides protection for truck beds of varying widths, while the vertical section 8 provides protection for truck beds of varying depth. Therefore, the bumper of the invention is capable of protecting the dock immediately adjacent the pit as well as a substantial distance laterally outward and downward from the dock surface.

FIGS. 5 and 6 illustrate a modified form of the invention in which three L-shaped bolts 17 are utilized to connect the bumper to the dock surface. The bumper 5 itself is identical in construction to that shown in FIGS. 1–4, but in this installation vertical curb angles 26 are secured to the dock and extend along the vertical edges bordering the pit 2. In this embodiment the leg 18 of the L-bolt 17 associated with the lowermost hole 11 in the bumper is welded to the curb angle 26, while the other leg extends through the hole 11 and receives a washer 20 and nut 21 as previously described. The L-bolts 17 associated with the upper holes 9 and 11 are welded to the curb angle 6 and described in connection with the first embodiment.

FIG. 7 illustrates a further modified form of the invention in which the bumper 5 is mounted on the dock surface by a series of studs 27 which are welded to both the upper curb angle 6 and to the vertical curb angle 26. In this case, however, the curb angles are provided with a greater width so that the studs which are welded to the curb angles can extend through the holes 9–11.

As shown in FIG. 7, the inner end of each stud 27 is welded to the curb angle, and the outer ends of the studs are threaded and receive washers 28 and nuts 29.

With the installation as shown in FIG. 7 the slots or recesses 13–16 formed in the backside of the bumper 5 provides no function.

The bumper of the invention provides both horizontal and vertical protection for the dock bordering the dockboard. As the bumper is symmetrical, identical bumpers can be utilized on both the left and right side of the dockboard.

We claim:

1. In combination with a loading dock, including a generally vertical front wall having a horizontal edge and a vertical edge joined to the horizontal edge at a corner, a generally L-shaped bumper formed of a resilient material mounted on the front wall of the dock, said bumper including a generally horizontal section disposed adjacent said horizontal edge and including a generally vertical section disposed adjacent the vertical edge, said bumper having an L-shaped substantially continuous outer surface facing in a direction away from said front wall, and mounting means for mounting the bumper on said front wall.

2. The construction of claim 1, wherein said bumper includes a first hole located at the junction of the horizontal and vertical sections and a second hole located in said vertical section and a third hole located in said horizontal section, the distance between said first and second holes being substantially equal to the distance between said first and third holes so that the bumper can be reversed in position and used on either side of the dockboard, said mounting means comprising a plurality of connecting members extending within the holes and secured to the dock.

3. The construction of claim 2, wherein said connecting members are generally L-shaped with each connecting member having a first leg secured to the front wall of the dock and disposed within a recess in the backside of the bumper and each connecting member including a second leg extending outwardly within one of said holes in said bumper.

4. The construction of claim 1, wherein said bumper includes a hole extending from the front to the rear of the bumper, and said mounting means comprises an L-shaped connecting member having a first leg secured to the front wall of the dock and having a second leg extending within said hole, the rear surface of said bumper being provided with a recess to receive said first leg of the connecting member.

5. The construction of claim 1, wherein said dock is provided with a recessed pit and said vertical edge borders the pit, and a dockboard mounted within the pit.

6. In combination with a loading dock having a loading surface and a generally vertical front wall extending downwardly from said loading surface, a metal support member secured to the front wall of the dock, a resilient bumper mounted on the front wall of the dock and having a hole extending from the front surface to the back surface of the bumper, the back surface of said bumper having a recess communicating with said hole, and a connecting member for securing the bumper to the front wall of the dock, said connecting member having a first leg secured to said support member and disposed within said recess and having a second leg located at an angle of about 90° with respect to the first leg and extending within said hole.

7. The construction of claim 6, wherein the support member is a curb angle located at the edge, joining the loading surface and the front wall, and said first leg is secured flatwise to the portion of the support member disposed on the front wall of the dock.

8. The structure of claim 6, wherein the outer portion of the hole is provided with an enlarged diameter and the outer end of the second leg is threaded, and said connecting member includes a nut threadedly engaged with the outer end of said second leg.

9. The structure of claim 6, wherein said bumper has an L-shape and includes a horizontal section and a vertical section.

10. The construction of claim 6, wherein said bumper is provided with a plurality of holes and a series of connecting members are employed to secure the bumper to the front wall of the dock with each connecting member being associated with a hole, the back surface of said bumper being provided with a series of recesses communicating with the respective holes to receive the first legs of the respective connecting members.

11. A resilient bumper having a generally L-shaped configuration and including a substantially continuous L-shaped outer surface and an opposed inner surface and having a peripheral surface connecting said outer surface and said inner surface, said bumper being provided with at least one hole extending from the outer surface to the inner surface and said inner surface being provided with a recess communicating with said hole and extending toward the peripheral surface.

12. The bumper of claim 11, wherein a plurality of holes extend from the outer surface to the inner surface and a recess communicates with each hole and extends toward the peripheral surface.

13. The bumper of claim 12, wherein said bumper includes a first leg and a second leg located at 90° with respect to said first leg, one of said holes being located at the junction of said first and second legs, a second hole being located in said first leg and a third hole being located in said second leg.

14. The structure of claim 13, wherein the distance between the first hole and second hole is equal to the distance between the first hole and the third hole.

15. The bumper of claim 13, wherein a pair of said recesses extend between said first hole and said peripheral surface with the recesses of said pair being disposed at 90° with respect to each other.

16. The bumper of claim 11, wherein said bumper includes a first leg and a second leg located at 90° with respect to the first leg, said bumper having a first hole located at the junction of said first and second legs, a second hole located in said first leg, and a third hole located in said second leg, said peripheral surfaces includes an outer L-shaped section and an inner L-shaped section, the inner surface of said bumper being provided with a series of recesses, a first recess extending between said first hole and the outer section of said peripheral surface, a second recess extending between said first hole and said outer section of the peripheral surface and disposed at 90° with respect to said first recess, a third recess extending between said second hole and the outer section of said peripheral surface, and a fourth recess extending between the third hole and said outer section of said peripheral surface.

* * * * *